(12) United States Patent
Fink et al.

(10) Patent No.: US 9,970,782 B1
(45) Date of Patent: May 15, 2018

(54) RFID-ENABLED ANGULAR POSITION SENSING SYSTEM

(71) Applicant: The United States of America as represented by the Administrator of the National Aeronautics and Space, Washington, DC (US)

(72) Inventors: Patrick W. Fink, Missouri City, TX (US); Timothy F. Kennedy, Sugar Land, TX (US); Gregory Y. Lin, Friendswood, TX (US); Phong H. Ngo, Friendswood, TX (US); Si Hui Yang, Houston, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 233 days.

(21) Appl. No.: 15/080,048

(22) Filed: Mar. 24, 2016

(51) Int. Cl.
*G01D 5/12* (2006.01)
(52) U.S. Cl.
CPC ..................... *G01D 5/12* (2013.01)
(58) Field of Classification Search
CPC ...... G01D 5/12; G01B 21/047; G01B 11/007; G01B 5/012; G01B 11/27; G01B 7/026
USPC ....................................................... 33/1 PT
See application file for complete search history.

(56) References Cited

U.S. PATENT DOCUMENTS

| | | | |
|---|---|---|---|
| 6,404,354 B1 | 6/2002 | Decker et al. | |
| 6,888,471 B2 | 5/2005 | Elsner et al. | |
| 7,683,799 B2 | 3/2010 | Ma | |
| 8,106,758 B2 | 1/2012 | Loehndorf et al. | |
| 8,773,279 B2 | 7/2014 | Shen et al. | |
| 8,933,789 B1 * | 1/2015 | Fink ..................... | G06Q 10/087 340/10.1 |
| 9,208,362 B1 * | 12/2015 | Fink ..................... | H04W 4/008 |
| 9,483,674 B1 * | 11/2016 | Fink ..................... | G06K 7/10366 |
| 9,715,609 B1 * | 7/2017 | Fink ..................... | G06K 7/10366 |
| 9,760,750 B1 * | 9/2017 | Fink ..................... | G06K 7/10316 |

* cited by examiner

*Primary Examiner* — Yaritza Guadalupe-McCall
(74) *Attorney, Agent, or Firm* — Kurt G. Hammerle; Edward K. Fein; Mark P. Dvorscak (57) ABSTRACT

An angular position sensing system includes a first support with ring-shaped elements disposed thereon and spaced apart from one another in a curvilinear arrangement. Each ring-shaped element includes an electrically-conductive ring and an RFID integrated circuit electrically coupled to its electrically-conductive ring. A second support has an antenna coupled thereto that defines an electrically-conductive path commensurate in size and shape to at least a portion of the electrically-conductive ring. An interrogator transmits a signal to the antenna wherein electric current is generated along the antenna's electrically-conductive path and electromagnetic energy emanates from the antenna. Any ring-shaped element and its RFID integrated circuit energized by the electromagnetic energy generates in response a data transmission for receipt by the interrogator. A processor coupled to the interrogator derives information related to an angular position of one of the first support and second support using the data transmission.

20 Claims, 5 Drawing Sheets

RFID-ENABLED ANGULAR POSITION SENSING SYSTEM

ORIGIN OF THE INVENTION

The invention described herein was made by employees of the United States Government and may be manufactured and used by or for the Government of the United States of America for governmental purposes without the payment of any royalties thereon or therefor.

CROSS-REFERENCE TO RELATED PATENT APPLICATION(S)

This patent application is related to U.S. patent application Ser. No. 14/993,658, entitled "System for RFID-Enabled Information Collection" filed on Jan. 12, 2016.

FIELD OF THE DISCLOSURE

The present disclosure relates generally to radio frequency identification (RFID) sensor systems, and more particularly to an RFID-enabled system for sensing an angular position of a rotating structure.

SUMMARY

The embodiments described herein are directed to a system for sensing angular position. In one embodiment, a first support has a plurality of ring-shaped elements disposed thereon. The ring-shaped elements are spaced apart from one another in a curvilinear arrangement on the first support. Each ring-shaped element includes an electrically-conductive ring and an RFID integrated circuit electrically coupled to its electrically-conductive ring. A second support has an antenna coupled thereto. The antenna defines an electrically-conductive path commensurate in size and shape to at least a portion of the electrically-conductive ring. An interrogator transmits a signal to the antenna wherein electric current is generated along the antenna's electrically-conductive path and electromagnetic energy emanates from the antenna such that at least one of the ring-shaped elements and its RFID integrated circuit is energized by the electromagnetic energy. Each RFID integrated circuit so-energized generates a data transmission in response for receipt by the interrogator. A processor coupled to the interrogator includes a set of instructions for deriving information related to an angular position of one of the first support and second support, relative to the other, using the data transmission.

In another embodiment described herein, a first support has a plurality of identical ring-shaped elements disposed thereon. The ring-shaped elements are spaced apart from one another in a circular array. Each ring-shaped element is defined by a series circuit that includes an electrically-conductive ring and an RFID integrated circuit electrically coupled to its electrically-conductive ring. A second support has an antenna coupled thereto. The antenna defines an electrically-conductive path commensurate in size and shape to at least a portion of the electrically-conductive ring. The first support and second support are adapted for relative rotational movement wherein relative positioning between the antenna and the ring-shaped elements changes. An interrogator transmits a signal to the antenna wherein electric current is generated along the antenna's electrically-conductive path and electromagnetic energy emanates from the antenna such that at least one of the ring-shaped elements and its RFID integrated circuit is energized by the electromagnetic energy. Each RFID integrated circuit so-energized generates a data transmission in response for receipt by the interrogator. A processor coupled to the interrogator includes a set of instructions for deriving information related to an angular position of one of the first support and second support using the data transmission.

Another embodiment described herein includes a first support having a plurality of identical ring-shaped elements disposed thereon. The ring-shaped elements are spaced apart from one another in a circular array. Each ring-shaped element is defined by a series circuit that includes an electrically-conductive ring and an RFID integrated circuit electrically coupled to its electrically-conductive ring. A second support has an antenna coupled thereto. The antenna defines an electrically-conductive path commensurate in size and shape to at least a portion of the electrically-conductive ring. A rotating drive is coupled to one of the first support and second support wherein relative positioning between the antenna and the ring-shaped elements changes with rotation of the rotating drive. An interrogator transmits a signal to the antenna wherein electric current is generated along the antenna's electrically-conductive path and electromagnetic energy emanates from the antenna such that at least one of the ring-shaped elements and its RFID integrated circuit is energized by the electromagnetic energy. Each RFID integrated circuit so-energized generates a responsive data transmission for receipt by the interrogator. A processor (coupled to the interrogator) includes a set of instructions for deriving information related to an angular position of one of the first support and second support using the data transmission.

These and other embodiments described herein will be further understood and appreciated by those skilled in the art by reference to the following specification, claims, and appended drawings.

DETAILED DESCRIPTION OF EXEMPLARY EMBODIMENTS

Figure 1:
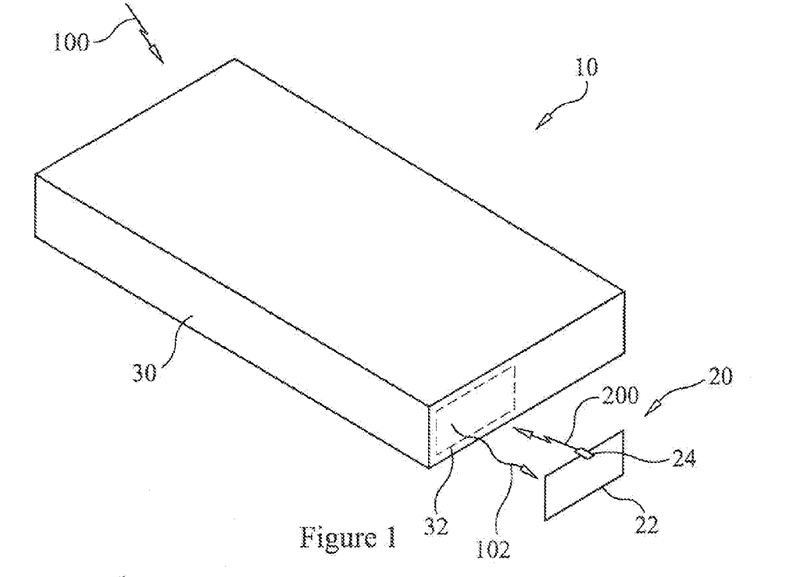
FIG. 1 is a schematic view of an embodiment of a sensor system for use in a radio frequency identification (RFID)-enabled angular position sensing system.

Referring now to the drawings, and more particularly to FIG. 1, an embodiment of a sensor system for use in a radio frequency identification (RFID)-enabled angular position sensing system is shown and referenced generally by numeral 10. Sensor system 10 is the basic sensing element of an angular position sensing system as will be described further below.

Sensor system 10 includes a ring-shaped element 20 and an antenna 30 spaced apart from ring-shaped element 20. The spacing between element 20 and antenna 30 can be fixed or variable depending on the goals of the particular sensing application. Ring-shaped element 20 includes an electrically-conductive ring 22 (e.g., wire, conductive trace, etc.) and an RFID integrated circuit 24 electrically coupled or connected with ring 22. In general, RFID integrated circuit 24 is an RFID element that can be energized by electromagnetic energy and generate in response a transmission indicative of data (e.g., unique identity data) once energized. Such RFID circuits are well known in the art. In the illustrated example, ring-shaped element 20 is a series electrical circuit that includes ring 22 and RFID integrated circuit 24. Further, ring 22 is rectangular and lies in a plane. For example, ring-shaped element 20 could be fabricated on a planar substrate (not shown) such as a printed circuit board or other substrate.

Antenna 30 is any of a variety of antennas that, when in receipt of a signal for which it is tuned, supports electric current along an electrically-conductive path whose shape and size are commensurate with some or all of the shape/size of ring 22. For example, in the illustrated embodiment, the electrically-conductive path should be rectangular or some portion thereof whose size/shape mirrors that of ring 22 or some portion thereof. The electrically-conductive path is defined along some or all of the dashed-line rectangle referenced by numeral 32. Suitable choices for antenna 30 include, but are not limited to, microstrip patch antennas (e.g., quarter wave, half wave, etc.), slot antennas, dipole antennas, and planar inverted-F antennas (PIFA). In general, when antenna 30 receives a signal 100 (from an RFID interrogator not shown in FIG. 1) for which antenna 30 is tuned, electric current travels along some or all of path 32 and antenna 30 emanates electromagnetic energy as indicated by wavy-lined arrow 102. Electromagnetic energy 102 couples to ring-shaped element 20 thereby energizing the operation of RFID integrated circuit 24. Once energized, RFID integrated circuit 24 generates in response a transmission back to the RFID interrogator (not shown in FIG. 1 but shown generally in FIG. 3) as an RF signal 200 via antenna 30. Generally speaking, the transmission from an energized RFID integrated circuit 24 contains "data," where such data can include one or more of stored identity data associated with RFID integrated circuit 24, sensed-condition data, inherent-condition data provided by the magnitude and/or phase associated with signal 200, etc. Coupling of electromagnetic energy 102 to ring-shaped element 20 is generally stronger when path 32 lies in a plane that is parallel to the plane containing ring-shaped element 20 and when path 32 aligns with the ring-shaped element. More generally, power transfer of energy 102 to ring-shaped element 20 is optimized when ring 22 enables a conjugate impedance match with the impedance of RFID integrated circuit 24. The prescribed positioning of the ring along the antenna's current path facilitates this conjugate impedance match. Attainment of the conjugate impedance match may require elongation of the ring, broadening it, meandering it, or aligning it with certain portions of path 32 known to support stronger or weaker currents. Thus, it is to be understood that the ring may not be fully parallel to the path of the current on the antenna in order to achieve the optimal match.

Figure 2:
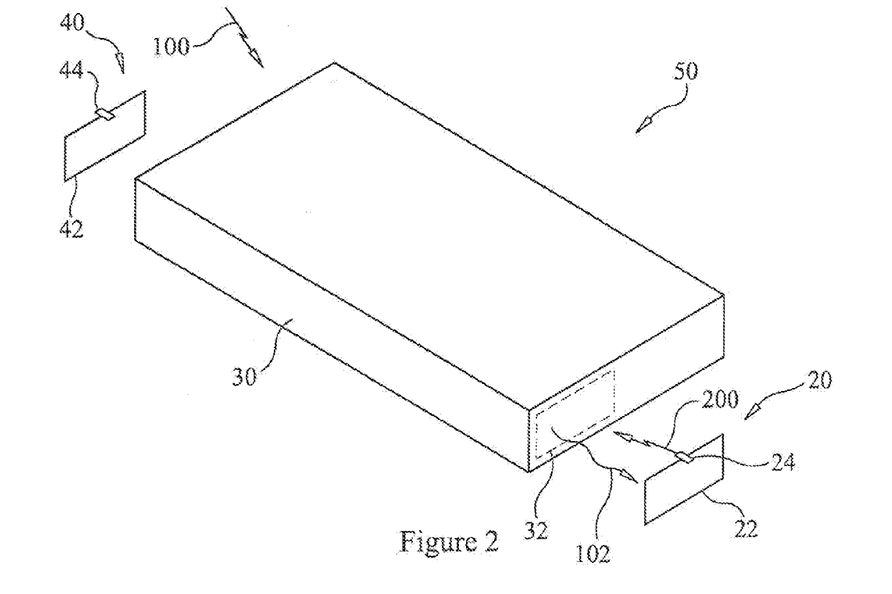
FIG. 2 is a schematic view of another embodiment of a sensor system for use in an RFID-enabled angular position sensing system.

Referring now to FIG. 2, another sensor system 50 includes the elements of sensor system 10 and further includes a reference ring-shaped element 40 positioned/configured to be in a fixed relationship to antenna 30. Element 40 includes an electrically-conductive ring 42 and an RFID integrated circuit 44 such that element 40 matches the configuration, size, and shape of ring-shaped element 20. Ring-shaped element 40 provides for calibration of sensor system 50 as well as providing a reference output (when energized) that can be used when evaluating the data associated with signal 200 transmitted by ring-shaped element 20. For example, the strength/magnitude and phase of the signal received from ring-shaped element 20 can be compared to the strength/magnitude and phase of the signal received from the fixed position of reference ring-shaped element 40 in order to estimate the position and orientation of ring-shaped element 20.

As mentioned above, the exemplary sensor system 10 or sensor system 50 can serve as the building block of an angular position sensing system that can be, for example, incorporated into a rotary controller. Examples of such angular position sensing systems will be described below with the aid of FIGS. 3 and 4. In each embodiment, data is transmitted from one or more ring-shaped elements in the same fashion as described above.

Figure 3:
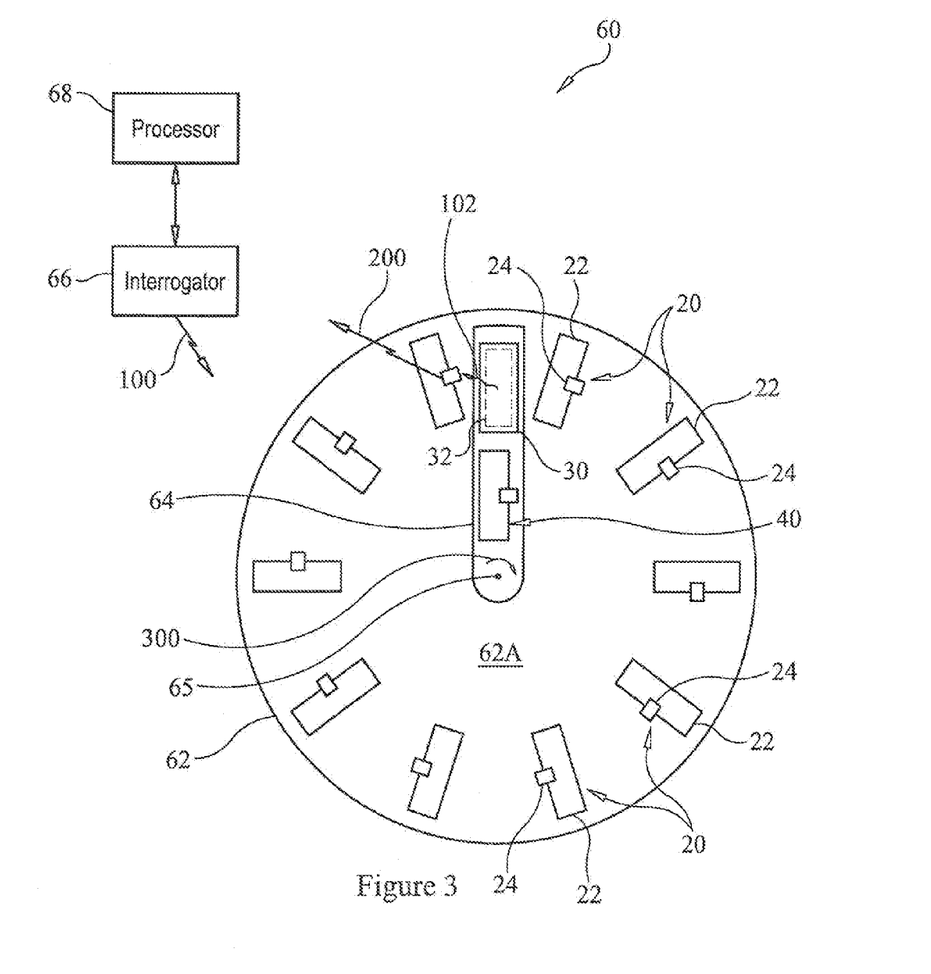
FIG. 3 is a schematic view of an RFID-enabled angular position sensing system in accordance with an embodiment described herein.

Referring first to the embodiment illustrated in FIG. 3, an RFID-enabled angular position sensing system 60 includes a plurality of identical ring-shaped elements 20 spaced-apart from one another in a curvilinear arrangement (e.g., a circular arrangement) on a two-dimensional planar surface 62A of a support 62. That is, all of ring-shaped elements 20 are affixed to planar surface 62A such that all elements 20 lie in a common plane. In the illustrated embodiment, support 62 is a structure that is not movable such that ring-shaped elements 20 are at fixed locations. Each of ring-shaped elements 20 includes an electrically-conductive ring 22 and an RFID integrated circuit 24 as described above. Each RFID integrated circuit 24 has a unique identity associated therewith where the unique identity is transmitted therefrom when circuit 24 is energized. Antenna 30 is mounted on a support 64 capable of movement relative to support 62. More specifically, support 64 is spaced apart from support 62 and is configured to move relative to support 62 such that antenna 30 tracks adjacent to the circular array of ring-shaped elements 20. Antenna 30 is positioned and fixed on support 64 such that some or all of the current path 32 will align with some or all of one of ring-shaped elements 20 as support 64/antenna 30 track adjacent to the circular array of elements 20. Supports 62/64, ring-shaped elements 20, and antenna 30 can be configured to maintain a parallel relationship between path 32 and the plane of each ring-shaped element 20. Movement of support 64 can be rotational movement 300 brought about by a rotating drive or pin 65 coupled to support 64 where rotational movement 300 results in corresponding movement of antenna 30. A reference ring-shaped element 40 can also be mounted on support 64 and used to facilitate calibration and/or provide reference data as described above. The orientation of reference ring-shaped element 40 relative to antenna 30 can be different than shown (e.g., it is oriented for parallel alignment with path 32) in another embodiment.

Antenna 30 can be any antenna configured and oriented such that its current path (i.e., some or all of path 32) is sized/shaped to match a portion of each ring 22 and lie in a plane that is parallel to the plane (i.e., the plane of surface 62A) containing ring-shaped elements 20. For example, if antenna 30 is a shorted quarter wave microstrip patch antenna, path 32 is defined at either end of the antenna that includes conductive edges of the top and bottom faces of the antenna and the edge of the conductive face of the antenna used to short the top and bottom faces as will be explained further below.

System 60 also includes an interrogator 66 and a processor 68 located remotely with respect to ring-shaped elements 20/40 and antenna 30. Interrogator 66 transmits signal 100 that is received by antenna 30. As a result and as described above with reference to FIGS. 1 and 2, electric current along path 32 causes electromagnetic energy 102 to emanate from antenna 30. Electromagnetic energy 102 coupled to one or more of ring-shaped elements 20 causes the energized ones thereof to transmit data via signal 200 that, in turn, is coupled to interrogator 66 via antenna 30. For example, the strongest signal 200 will result when current path 32 is aligned with one of ring-shaped elements 20, while more than one signal 200 will typically be generated when path 32 is between two of elements 20. The one or more received signals 200 are received by interrogator 66 and processed by processor 68. The one of ring-shaped elements 20 that is closest to antenna 30 will yield the strongest signal 200. Because each of RFID integrated circuits 24 has a unique identity transmitted in its signal 200, the strongest signal 200 is indicative of the angular position of antenna 30 relative to the array of ring-shaped elements 20. Alternatively, when one or more signal 200 is received by interrogator 66, processor 68 can estimate the angular position of antenna 30 by extrapolating or weighting the received signal strength/magnitude and/or phase. In the illustrated embodiment of system 60, support 62 is fixed and support 64 is moved relative thereto. However, it is to be understood that support 62 could be moved and support 64 could be fixed in another embodiment. System 60 can be used in a variety of applications. For example, rotating drive 65 could be a pinion gear of a rack-and-pinion gear system in which system 60 could be used to accurately measure a rotational or angular displacement that arises from a linear force as would be the case in a bathroom scale.

Figure 4:
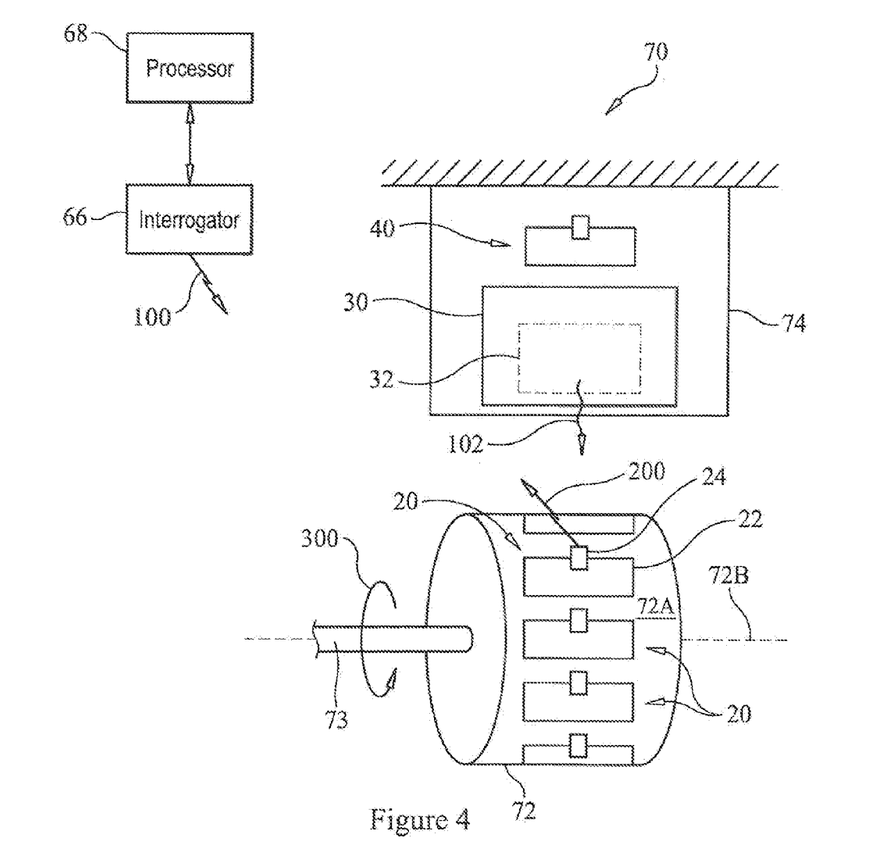
FIG. 4 is a schematic view of an RFID-enabled angular position sensing system in accordance with another embodiment described herein.

FIG. 4 illustrates another angular position sensing system embodiment described herein that is referenced generally by numeral 70. System 70 includes a plurality of identical ring-shaped elements 20 spaced-apart from one another in a curvilinear arrangement (e.g., a circular arrangement) on a three-dimensional surface such as a cylindrical surface 72A of a cylindrical support 72. That is, all of ring-shaped elements 20 are affixed to cylindrical surface 72A such that all elements 20 lie in the cylindrical plane of support 72. In general, the support surface for ring-shaped elements 20 can be a two-dimensional planar surface, a three-dimensional curved surface, or a collection of planar surfaces coupled together to define a polyhedral structure. In the illustrated embodiment, support 72 is a structure that is rotatable about the cylinder's longitudinal axis 72B as indicated by rotational movement or arrow 300. For example, a rotating drive or axle 73 can be coupled to support 72 to generate rotational movement 300. As in the previous embodiment, each of ring-shaped elements 20 includes an electrically-conductive ring 22 and an RFID integrated circuit 24. Each RFID integrated circuit 24 has a unique identity associated therewith where the unique identity is transmitted therefrom when circuit 24 is energized. Antenna 30 is mounted on a fixed support 74 that is spaced apart from support 72 such that antenna 30 tracks adjacent to the circular array of ring-shaped elements 20 as support 72 is rotated. Antenna 30 is positioned and fixed on support 74 such that some or all of the current path 32 will align with the closest one(s) of ring-shaped elements 20 as support 72/elements 20 rotate. Supports 72/74, ring-shaped elements 20, and antenna 30 can be configured to maintain a parallel (or nearly parallel) relationship between path 32 and at least a portion of the adjacent one of ring-shaped elements 20 as it rotates past antenna 30. A reference ring-shaped element 40 can also be mounted on support 74 and used to facilitate calibration and/or provide reference data as described above. The orientation of reference ring-shaped element 40 relative to antenna 30 can be different than that shown (e.g., can be oriented for parallel alignment with path 32). Antenna 30 can be any antenna configured and oriented such that its current path (i.e., some or all of path 32) is sized/shaped to match a portion of a ring-shaped element 20 that is parallel (or nearly parallel) to the path 32 as support 72 rotates.

System 70 also includes an interrogator 66 and a processor 68 located remotely with respect to ring-shaped elements 20/40 and antenna 30. Interrogator 66 transmits signal 100 that is received by antenna 30. As a result and as described previously, electric current along path 32 causes electromagnetic energy 102 to emanate from antenna 30. Electromagnetic energy 102 coupled to one or more of ring-shaped elements 20 causes the energized ones thereof to transmit data via signal 200 that, in turn, is coupled to interrogator 66 through antenna 30. For example, the strongest signal 200 will result when current path 32 is most closely aligned with one of ring-shaped elements 20, while more than one signal 200 will typically be generated when path 32 is between two of elements 20. The one or more received signals 200 are received by interrogator 66 and processed by processor 68. The one of ring-shaped elements 20 that is closest to antenna 30 will yield the strongest signal 200. Because each of RFID integrated circuits 24 has a unique identity transmitted in its signal 200, the strongest signal 200 is indicative of the angular position of support 72 relative to antenna 30. In the illustrated embodiment of system 70, support 74 is fixed and support 72 is moved relative thereto. However, it is to be understood that in another embodiment support 74 could be moved and support 72 could be fixed.

Figure 5:
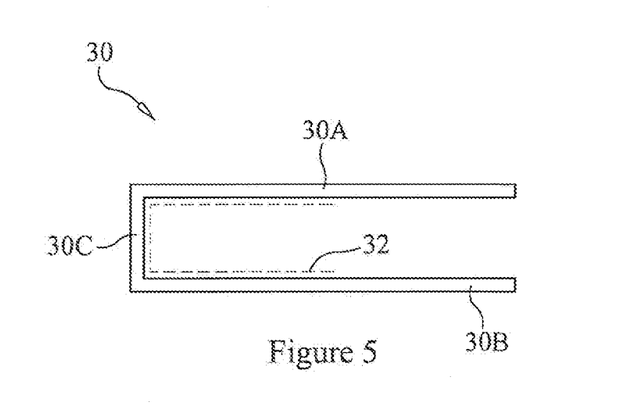
FIG. 5 is side view of a quarter wave microstrip patch antenna that can be used in embodiments described herein.
Figure 6:
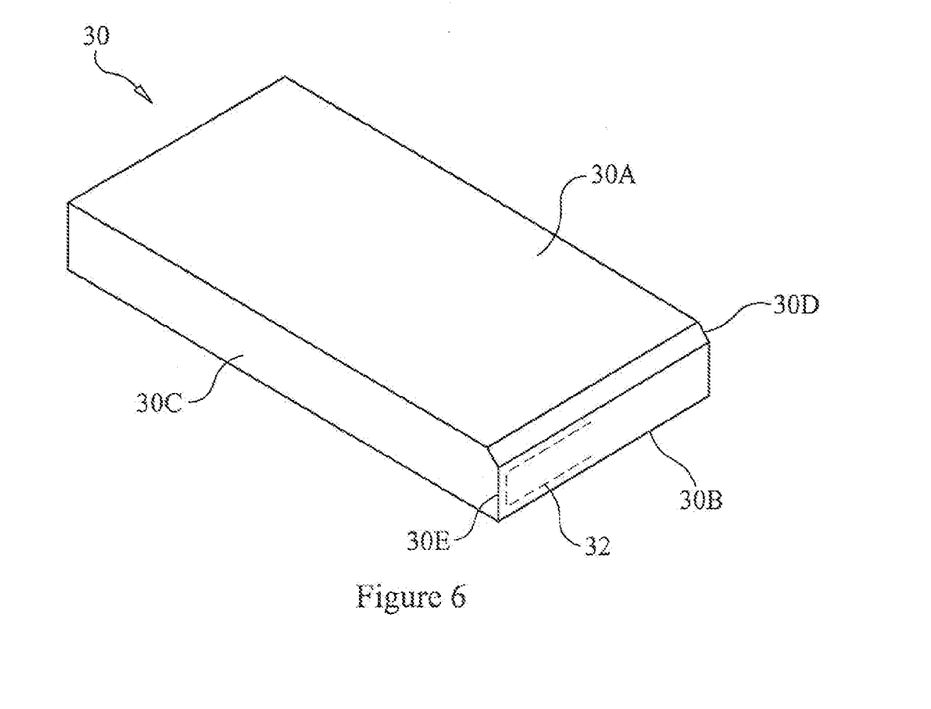
FIG. 6 is a perspective view of a modified quarter wave microstrip patch antenna that can be used in embodiments described herein.
Figure 7:
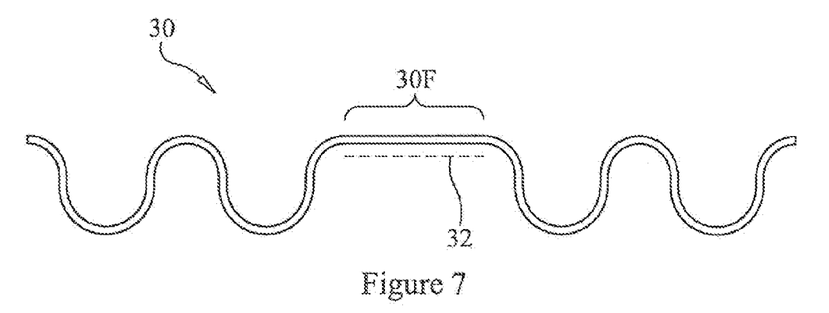
FIG. 7 is a side view of a meandering half wave dipole antenna that can be used in embodiments described herein.
Figure 8:
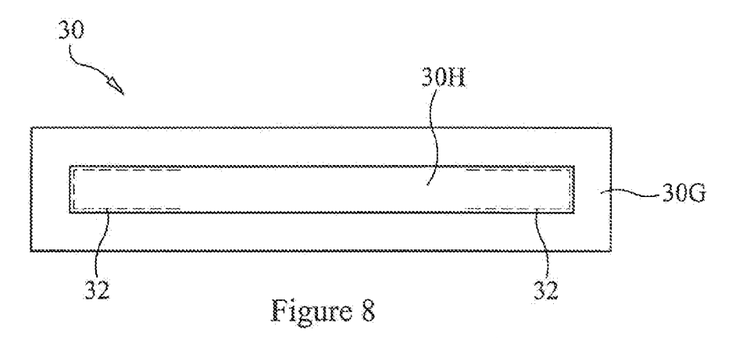
FIG. 8 is a side view of a slot antenna that can be used in embodiments described herein.
Figure 9:
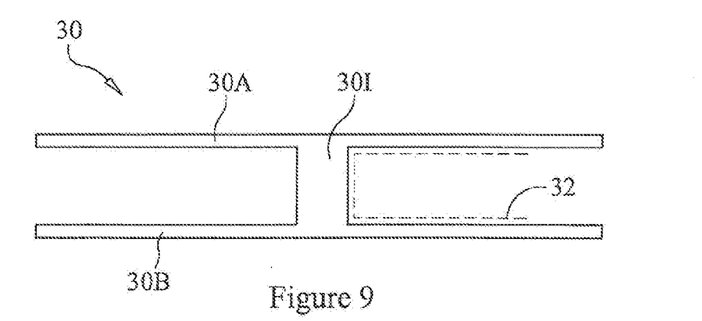
FIG. 9 is an end view of a planar inverted-F antenna that can be used in embodiments described herein.

As mentioned above, the angular position sensing systems described herein can use a variety of antennas for the above-described antenna 30. In general, such antennas include microstrip patch antennas, dipole antennas, slot antennas, and planar inverted-F antennas (PIFA). Several exemplary antennas are shown in FIGS. 5-9, wherein a portion 32 of an electrically-conductive path defined by the antenna is illustrated therewith. As described above, path portion 32 (or simply "path" hereinafter) is commensurate in size and shape to at least a portion of the ring-shaped element that will be used in conjunction with the antenna. In FIG. 5, a side view of a quarter wave microstrip patch antenna 30 illustrates that the antenna has spaced-apart top and bottom surface conductors 30A and 30B, respectively, shorted together along one edge thereof by a shorting back conductor 30C. Because current is strongest at the shorted end of the antenna, the antenna can be positioned such that path 32 (that is to align with a ring-shaped element 20) is at the shorted end. Note that path 32 is created at either side of the antenna thereby supporting the antenna's interrogation of a reference ring-shaped element 40 as described earlier herein. In FIG. 6, a modified quarter wave microstrip patch antenna 30 has spaced-apart top and bottom surface conductors 30A and 30B, respectively, and a shorting back conductor 30C. A chamfered face conductor 30D angles downward from top surface 30A towards bottom surface 30B to thereby define a shorter-length shorting conductor edge 30E as compared to a quarter wave microstrip patch antenna without a chamfered face conductor. Path 32 is at the shorted end as in the previous example of FIG. 5. Chamfered face conductor 30D allows a greater spacing between surface conductors 30A and 30B for impedance matching and bandwidth purposes, while also providing for the use of a shorter conductor edge 30E for closer ring spacing and hence improved spatial resolution. In FIG. 7, a meandering half wave dipole antenna 30 has a straight center portion 30F where current is stronger than at the ends of the dipole. Accordingly, this type of antenna would be positioned such that center portion 30F defines path 32 for purposes of the embodiments described herein. FIG. 8 illustrates a slot antenna 30 defined by a conductive portion 30G surrounding a non-conductive slot 30H. Currents are typically strongest at either end of slot 30H such that either end of slot 30H defines a path 32. FIG. 9 illustrates a PIFA 30 having spaced-apart top and bottom surface conductors 30A and 30B, respectively, and a shorting section 30I along a portion of one edge of surface conductors 30A and 30B. Currents are strongest along both sides of section 30I such that two paths 32 are defined.

While some embodiments have been herein illustrated, shown and described, it is to be appreciated that various changes, rearrangements and modifications may be made, without departing from the scope of the invention as defined by the appended claims. It is intended that the specific embodiments and configurations are disclosed for describing the manner and process of making and using the invention, and should not be interpreted as limitations on the scope of the invention as defined by the appended claims.

Although only a few exemplary embodiments have been described in detail above, those skilled in the art having now the benefit of this description will readily appreciate that many modifications are possible in the exemplary embodiments without materially departing from the novel teachings described herein. Accordingly, all such modifications are intended to be included within the scope of this invention as defined in the following claims. In the claims, means-plus-function and step-plus-function clauses are intended to cover the structures or acts described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed as new and desired to be secured by Letters Patent of the United States is:

1. A system for sensing angular position, comprising:
   a first support;
   a plurality of ring-shaped elements disposed on said first support and spaced apart from one another in a curvilinear arrangement, each of said ring-shaped elements including an electrically-conductive ring and an RFID integrated circuit electrically coupled to said electrically-conductive ring;
   a second support;
   an antenna coupled to said second support, said antenna defining an electrically-conductive path commensurate in size and shape to at least a portion of said electrically-conductive ring; and
   an interrogator for transmitting a signal to said antenna wherein an electric current is generated along said electrically-conductive path and electromagnetic energy emanates from said antenna, wherein at least one of said ring-shaped elements and said RFID integrated circuit associated therewith is energized by said electromagnetic energy, and wherein each said RFID integrated circuit so-energized generates a data transmission for receipt by said interrogator and for further processing of an angular position of one of said first support and said second support using said data transmission.

2. The system of claim 1, wherein said electrically-conductive path is parallel to said first support.

3. The system of claim 1, wherein each of said ring-shaped elements is rectangular.

4. The system of claim 1, wherein said data transmission includes a unique identity for each said RFID integrated circuit.

5. The system of claim 1, wherein said antenna is selected from the group consisting of a microstrip patch antenna, a slot antenna, a dipole antenna, and a planar inverted-F antenna.

6. The system of claim 1, wherein said first support comprises a two-dimensional surface.

7. The system of claim 1, wherein said first support comprises a three-dimensional surface.

8. The system of claim 1, wherein said first support and said second support are adapted for relative movement therebetween.

9. The system of claim 1, further comprising a reference ring-shaped element coupled to at least one of said antenna and said second support, said reference ring-shaped element maintained in a fixed relationship with respect to said antenna, said reference ring-shaped element including an electrically-conductive reference ring and a reference RFID integrated circuit electrically coupled to said electrically-conductive reference ring, said reference ring element being positioned to be energized by said electromagnetic energy emanating from said antenna.

10. The system of claim 1, wherein said data transmission includes magnitude and phase information associated therewith.

11. An apparatus for sensing angular position, comprising:
   a first support;
   a plurality of ring-shaped elements disposed on said first support and spaced apart from one another in a curvilinear arrangement, each of said ring-shaped elements defining a series circuit to include an electrically-conductive ring and an RFID integrated circuit electrically coupled to said electrically-conductive ring;
   a second support;
   an antenna coupled to said second support, said antenna defining an electrically-conductive path commensurate in size and shape to at least a portion of said electrically-conductive ring; and
   a rotating drive coupled to one of said first support and said second support wherein relative positioning between said antenna and said ring-shaped elements changes with rotation of said rotating drive;
   said antenna being configured, when in receipt of a radio frequency signal for which said antenna is tuned, for supporting an electric current generated along said electrically-conductive path and for emanating electromagnetic energy from said antenna,
   wherein at least one of said ring-shaped elements and said RFID integrated circuit associated therewith is energized by said electromagnetic energy, and
   wherein each said RFID integrated circuit so-energized generates in response a data transmission including information related to an angular position of one of said first support and said second support for receipt by a RFID interrogator via said antenna.

12. The system of claim 11, wherein said electrically-conductive path is parallel to said plane.

13. The system of claim 11, wherein each of said ring-shaped elements is rectangular.

14. The system of claim 11, wherein said data transmission includes a unique identity for each said RFID integrated circuit.

15. The system of claim 11, wherein said antenna is selected from the group consisting of a microstrip patch antenna, a slot antenna, a dipole antenna, and a planar inverted-F antenna.

16. The system of claim 11, wherein said first support comprises a two-dimensional surface.

17. The system of claim 11, wherein said first support comprises a three-dimensional surface.

18. The system of claim 11, further comprising a reference ring-shaped element coupled to at least one of said antenna and said second support, said reference ring-shaped element maintained in a fixed relationship with respect to said antenna, said reference ring-shaped element including an electrically-conductive reference ring and a reference RFID integrated circuit electrically coupled to said electrically-conductive reference ring, said reference ring element being positioned to be energized by said electromagnetic energy emanating from said antenna.

19. The system of claim 11, wherein said data transmission includes magnitude and phase information associated therewith.

20. A system for sensing angular position, comprising:
a first support;
a plurality of identical ring-shaped elements disposed on said first support and spaced apart from one another in a circular array, each of said ring-shaped elements defining a series circuit to include an electrically-conductive ring and an RFID integrated circuit electrically coupled to said electrically-conductive ring;
a second support;
an antenna coupled to said second support, said antenna defining an electrically-conductive path commensurate in size and shape to at least a portion of said electrically-conductive ring;
said first support and said second support adapted for relative rotational movement wherein relative positioning between said antenna and said ring-shaped elements changes;
an interrogator for transmitting a signal to said antenna wherein an electric current is generated along said electrically-conductive path and electromagnetic energy emanates from said antenna, wherein at least one of said ring-shaped elements and said RFID integrated circuit associated therewith is energized by said electromagnetic energy, and wherein each said RFID integrated circuit so-energized generates in response a data transmission for receipt by said interrogator; and
a processor coupled to said interrogator for deriving information related to an angular position of one of said first support and said second support using said data transmission.

* * * * *